T. R. & S. KNOWLES.
Harvester Cutter.
No. 74,550. Patented Feb. 18, 1868.
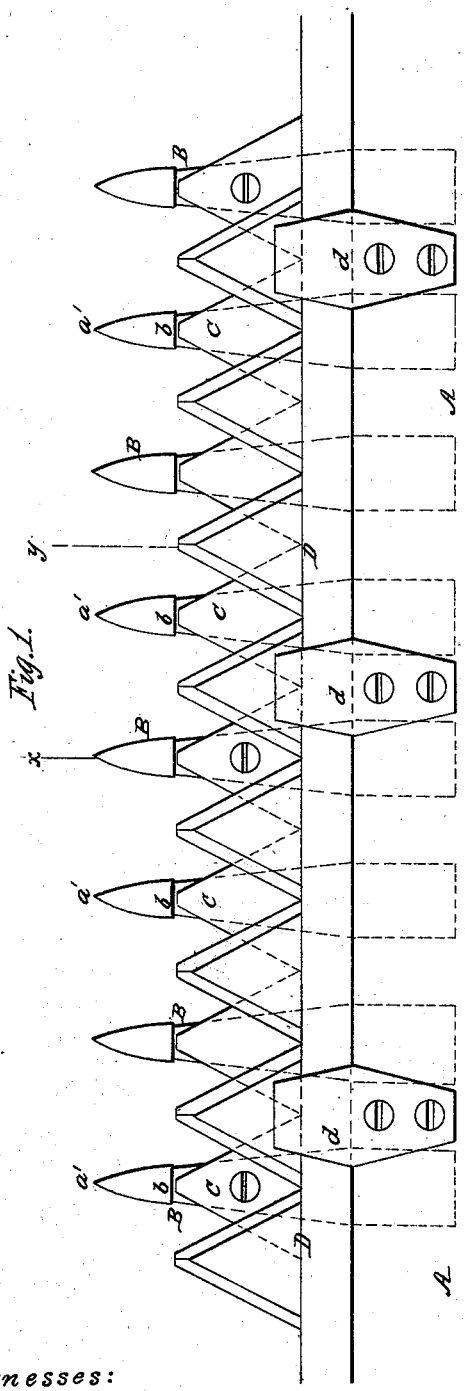
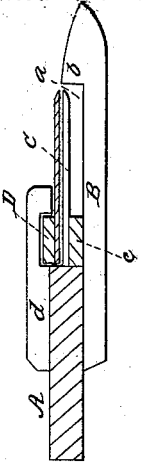
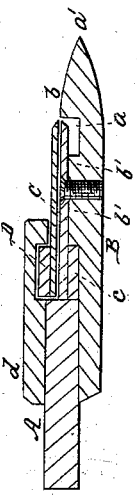
Witnesses:
Inventors:
Thomas Knowles
Robert Knowles
Samuel Knowles

United States Patent Office.

THOMAS KNOWLES, ROBERT KNOWLES, AND SAMUEL KNOWLES, OF JERSEY CITY, NEW JERSEY.

Letters Patent No. 74,550, dated February 18, 1868.

IMPROVEMENT IN HARVESTER-CUTTERS.

*The Schedule referred to in these Letters Patent and making part of the same.*

TO ALL WHOM IT MAY CONCERN:

Be it known that we, THOMAS KNOWLES, ROBERT KNOWLES, and SAMUEL KNOWLES, all of Jersey City, in the county of Hudson, and State of New Jersey, have invented certain new and useful Improvements in Harvesters; and we do hereby declare that the following is a full, clear, and exact description of the same, reference being had to the accompanying drawings, making a portion of this specification, in which—

Figure 1 is a plan view of the cutter-bar of a harvester constructed according to our invention.

Figure 2 is a vertical transverse section of the same, taken in the line $x\,x$ of fig. 1.

Figure 3 is a similar transverse section, taken in the line $y\,y$ of fig. 1.

Similar letters of reference indicate corresponding parts in both figures.

The object of this invention is to provide a cutting-mechanism for harvesters, which may not only be manufactured or "fitted up" at a much less cost than the devices of this class hitherto in use, but which will also operate much more efficiently in cutting the grain or grass, and thereby materially reduce the draught of the machine.

The invention consists in the combination, with the finger-guards of peculiar construction, of a series of fixed shearing-knives attached to a bar, and supported by two or more blocks on the fingers, so as to be removable altogether, a vibrating sickle, and the finger-bar, whereby the results mentioned are effectually secured.

To enable others to understand the construction and operation of our invention, we will proceed to describe it with reference to the drawings.

A represents the finger-bar, to the under side of which are bolted or otherwise properly secured the finger-guards B. The upper surfaces of these guards, from the forward edge of the finger-bar to the point $a$, are flat, as shown more fully in figs. 2 and 3. Forward of the point $a$, just mentioned, the guards are formed with upwardly-projecting extensions, $b$, and the sides and bottoms of the said guards are formed upon suitable curved lines, so that they terminate in points at $a'$. C indicates fixed triangular knives secured upon a bar, $c$, which rests upon the guards B, just in front of the finger-bar, the said knives being situated one over each of the aforesaid guards B, and at a distance therefrom equal to the thickness of the bar $c$, as shown in fig. 3. In order to better sustain these knives in position, a number of them, say every fourth one, has fitted or formed underneath it, and upon the guard adjacent, a supporting-block, $b'$, to which it is fastened by a screw or other appropriate means, as represented in fig. 2. The vibrating sickle, which may be of the ordinary construction, and vibrated by the usual means, is shown at D, and, resting upon the series of knives C, is held in position by suitable lugs, $d$, secured to the upper side of the finger-bar.

In the operation of the harvester, the guards divide the standing grain or grass, so that, as the machine is drawn along, the grain or grass is brought between the fixed knives C and the triangular cutters of the sickle D, and is severed between the edges of the said knives and cutters with a clean, smooth cut, which requires a much less expenditure of force than when the cutting is performed by the edge of the moving cutters or sickle alone upon the grain or grass sustained against the action of such sickle by the slotted guards in ordinary use, the draught of the machine being by this means materially reduced; furthermore, the guards B, being of the form hereinbefore described, may be made at a much less cost than the common guards just mentioned, and, inasmuch as the upper surfaces of the guards are not designed to be brought in contact with either the vibrating sickle or the fixed knives, it follows that a comparatively slight degree of care or skill is required in properly fitting the said guards to the cutter-bar.

What we claim as our invention, and desire to secure by Letters Patent, is—

The fixed knives C, attached to the finger-bar by means of the connecting-bar $c$ and supporting-blocks $b'$, substantially as shown and described.

THOMAS KNOWLES,
ROBERT KNOWLES,
SAMUEL KNOWLES.

Witnesses:
J. W. COOMBS,
A. LE CLERC.